United States Patent [19]

Sellin et al.

[11] Patent Number: 5,491,719
[45] Date of Patent: Feb. 13, 1996

[54] SYSTEM FOR HANDLING DATA ERRORS ON A CELLULAR COMMUNICATIONS SYSTEM PCM LINK

[75] Inventors: Patrik C. Sellin, Upplands Väsby; Örjan P. S. Fall, Sollentuna; Anders K. Molin, Solna; Lars J. Wilhelmsson, Sundbyberg, all of Sweden

[73] Assignee: Telefonaktiebolaget LM Ericsson, Stockholm, Sweden

[21] Appl. No.: 85,044

[22] Filed: Jul. 2, 1993

[51] Int. Cl.$^6$ .............................. H04B 3/46; G06F 11/00; H04M 11/00
[52] U.S. Cl. ........................ 375/213; 371/31; 379/63
[58] Field of Search .................... 371/31, 67.1, 48; 375/10, 40, 100, 213; 340/825.16, 825.44; 379/60, 63

[56] References Cited

U.S. PATENT DOCUMENTS

| | | | |
|---|---|---|---|
| 4,286,334 | 8/1981 | Gammel | 375/40 |
| 4,701,939 | 10/1987 | Stutt et al. | 375/115 |
| 4,872,171 | 10/1989 | Wakamura | 371/40.1 |
| 5,072,449 | 12/1991 | Enns et al. | 371/37.1 |
| 5,084,891 | 1/1992 | Ariyavisitakul | 371/42 |
| 5,123,014 | 6/1992 | Federkins et al. | 370/110.1 |
| 5,128,945 | 7/1992 | Enns et al. | 371/37.1 |
| 5,146,609 | 9/1992 | Tayloe et al. | 455/33.2 |
| 5,148,431 | 9/1992 | Hayashi | 371/5.1 |
| 5,148,487 | 9/1992 | Nagai | 381/46 |
| 5,150,362 | 9/1992 | Akerberg | 370/95.1 |
| 5,255,343 | 10/1993 | Su | 395/2.51 |

*Primary Examiner*—Edward L. Coles, Sr.
*Assistant Examiner*—Allan A. Esposo
*Attorney, Agent, or Firm*—Burns, Doane, Swecker & Mathis

[57] ABSTRACT

A digital cellular communications system has a bidirectional pulse code modulation (PCM) link for conveying encoded speech and control data in the form of blocks, a switching unit coupled to a first end of the PCM link, and a base station coupled to a second end of the PCM link. The switching unit includes a speech encoder for encoding speech signals, an error detection code generator for generating an error detection code from the encoded speech signal, and a formatter, coupled to the error detection code generator, for producing a formatted block to be transmitted on the PCM link, the formatted block having a header, the encoded speech dam, and the error detection code. The base station has a PCM link error detector for signalling the existence of an error in a received block in response to the received block containing an error. The base station further includes a downlink error handler coupled to the PCM link error detector, for discarding a received block in response to the signal indicating the existence of an error therein, and for substituting therefor a default control message to be relayed to a mobile station, the default control message having no meaning defined by the digital cellular communications system, whereby the mobile station, in response to receiving the default control message, performs no operation other than a bad frame masking operation. Uplink error detection and handling is also provided.

15 Claims, 4 Drawing Sheets

| # SYSTEM FOR HANDLING DATA ERRORS ON A CELLULAR COMMUNICATIONS SYSTEM PCM LINK

BACKGROUND

The present invention relates to radiotelephone communication systems and more particularly to a method and apparatus for detecting errors in a radiotelephone communications switching unit to base station PCM link, and for handling communications with a mobile unit in the event of a loss of a communications block on the PCM link.

Figure 1A:
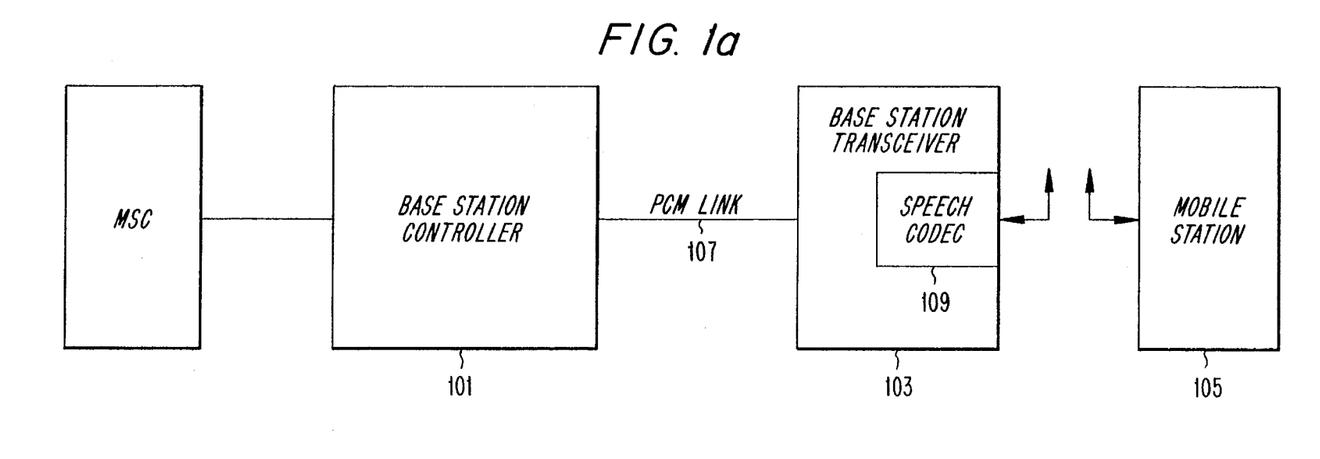
FIGS. 1a and 1b are block diagrams of known cellular telephone communications systems including a PCM link between the base station controller and the base transceiver station, and having a speech codec located, respectively, in the base transceiver station and the base station controller.

A cellular telephone communications system such as the European Global System for Mobile Communication (GSM) mobile telephone system may include elements as shown in FIG. 1a. A base transceiver station (BTS) 103 is connected to a Base Station Controller (BSC) 101 by means of a Pulse Code Modulation (PCM) link 107. The base transceiver station 103 includes a speech coder-decoder (codec) 109. In the past, digitized speech signals have been transmitted by the BSC 101 at a rate of 64 kilobits per second (kbps) to the base transceiver station 103 by means of the PCM link 107. Once inside the base transceiver station 103, a speech codec 109 transforms the digitized speech into blocks of parameters having fewer bits than the original, thus enabling the speech to be transmitted to the mobile station 105 at a lower bit rate than is possible for the original speech samples. The encoded speech signals are converted back into the original speech samples by a speech decoder (not shown) located inside the mobile station 105.

Figure 1B:
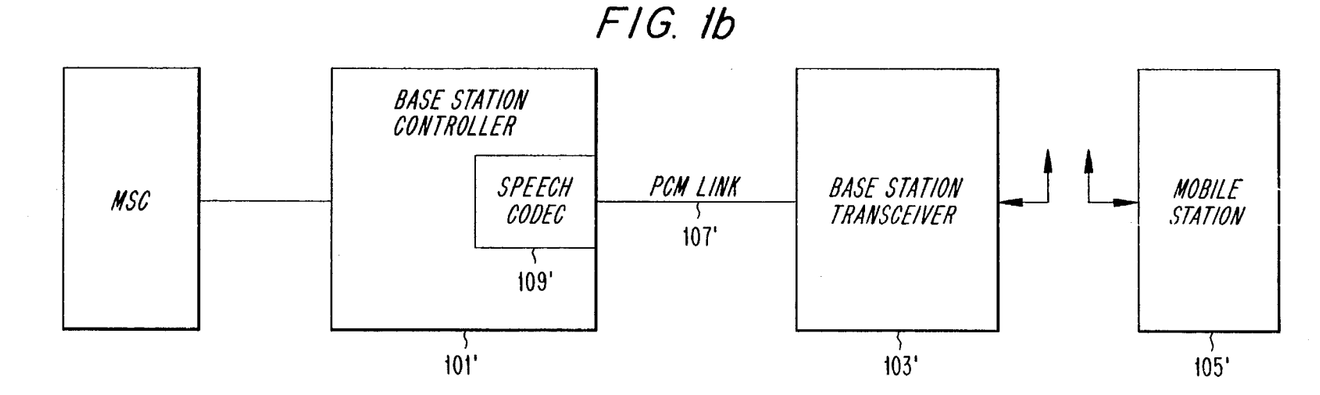

Recently, the design of systems, such as the GSM system, have been modified as shown in FIG. 1b so that the speech codec 109' is located within the BSC 101' instead of in the base transceiver station 103'. The speech codec 109 may accept, for example, 160 speech samples for each 20 msec of speech, and produce therefrom blocks of encoded speech having a lower bit rate than the original speech. This produces the advantage of allowing transmission over the PCM link 107' of more speech between the base transceiver station 103' and the BSC 101' than was possible before.

The base transceiver station 103' channel encodes, modulates, and transmits each received block of coded speech to the mobile station 105' by means of a radio link. In addition to transmitting coded speech to the mobile station 105', the base transceiver station 103' may also transmit control information generated by a control part (not shown) of the base transceiver station 103'. As previously mentioned, the mobile station 105' also contains a codec (not shown) for reconstructing the original speech from the received blocks of coded speech.

Transmission of speech from the mobile station 105' to the BSC 101' works in a similar way. The mobile station 105' generates and transmits modulated, channel encoded blocks of coded speech to the base transceiver station 103'. The base transceiver station 103' performs demodulation and channel decoding on the received blocks, and uplinks the coded speech to the BSC 101' by means of the PCM link 107'. Should the base transceiver station 103' determine that it has received control information rather than encoded speech from the mobile station 105', then this control information is routed to the control part of the base transceiver station 103'.

One characteristic of the system as described above is the introduction of errors into the encoded speech blocks due to their transmission over the PCM link 107'. When the speech codec was located in the base transceiver station 103 instead of the BSC 101', there was little need for fault handling on a PCM link because the quality of the received speech is not seriously degraded by the presence of such introduced errors. However, with the speech codex 109' located in the BSC 101', the speech on the PCM link 107' is compressed into fewer bits. As a result, any errors introduced during transmission on the PCM link 107' seriously effect the quality of the speech after it is decoded.

However, prior systems transmitted encoded speech parameters without any mechanism for detecting errors introduced by the PCM link 107'. For example, in one well known system, the base transceiver station 103' is able to detect, by means of poor received signal quality, the occurrence of errors in speech received from the mobile station 105'. Because the speech received by the base transceiver station 103' from the mobile station 105' is encoded, the detected errors can seriously degrade the quality of the received speech. Consequently, in this well known system, a single bit, called the Bad Frame Indicator (BFI) is sent by the base transceiver station 103' to the BSC 101' along with the block of speech which has been decoded by the base transceiver station 103. When the BSC 101' detects the BFI being set (indicating the presence of errors introduced on the radio channel between the mobile station 105' and the base transceiver station 103'), it discards the received block of speech and instead passes information from the previously received block to the public telephone system. The rationale for doing this is that the previously received speech block is likely to closely resemble what the present speech block should look like, so that speech quality will be maintained.

However, this well known system, which includes the BFI bit, is incapable of detecting errors that are introduced by transmission of speech on the PCM link 107'. As mentioned earlier, this was not critical when the speech codec 109 was located in the base transceiver station 103, since errors introduced into unencoded speech did not seriously degrade the quality of that speech. However, with the codec 109' located in the BSC 101', the detection and subsequent handling of errors introduced by transmission on the PCM link 107' is now quite important.

SUMMARY

It is therefore an object of the present invention to provide for the detection of bit errors introduced into blocks of encoded speech that are transmitted on a PCM link between an MSC and a base station in a mobile telephone communications system.

It is a further object of the present invention to reduce the effect of moderate levels of bit errors that occur on the PCM link in such a system, and thereby to maintain speech quality.

In accordance with one aspect of the present invention, the foregoing and other objects are achieved in a digital cellular communications system comprising a bidirectional pulse code modulation (PCM) link for conveying encoded speech and control data in the form of blocks, a switching unit coupled to a first end of the PCM link, and a base station coupled to a second end of the PCM link. The switching unit includes a speech codec for encoding downlink speech signals and decoding uplink speech signals that are respectively transmitted to and received from the base station by means of the PCM link. The PCM link conveys encoded downlink and uplink speech and control data in the form of respective downlink and uplink blocks. The base station operates to relay an encoded downlink speech signal received from the switching unit to a mobile station by means of transmission on a radio channel and to relay to the switching unit an encoded uplink speech signal received from the mobile station by means of transmission on the PCM link. In accordance with the present invention, the digital cellular communications system has a system for handling errors in a transmitted block. The error handling system comprises, in the base station, input means for receiving a signal indicative of existence of an error in a received downlink block; and, in the base station, downlink error handling means coupled to the input means, for discarding a received downlink block in response to the signal indicating existence of an error therein, and for substituting therefor a default control message to be relayed to the mobile station. The default control message has no meaning defined by the digital cellular communications system, so that when it is relayed to a mobile station, the mobile station responds by performing no operation other than a bad frame masking operation. In this fashion, speech quality is maintained by the mobile station whenever the base station detects errors in a received block.

In another aspect of the invention, the default control message is a default fast access control channel (FACCH) message.

In yet another aspect of the invention, the downlink error handling means substitutes for the discarded received downlink block, alternatively, the default control message or a non-default control message in response to respective non-availability or availability of the non-default control message to be transmitted. Thus, the fact that a received block contains errors and must be discarded may be used to advantage when a real non-default control message is available.

In still another aspect of the invention, the switching unit includes PCM link transmission means. The PCM link transmission means include means for generating an error detection code from the encoded downlink speech signal, and formatting means, coupled to the generating means, for producing a formatted downlink block to be transmitted on the PCM link. The formatted downlink block includes a header, the encoded downlink speech data and/or control information, and the error detection code. The base station further includes PCM link error detecting means, coupled to the input means, for signalling existence of an error in a received block in response to the received downlink block containing an error. In this fashion, errors that are introduced on the PCM link, as encoded speech data is transmitted from the switching unit to the base station, may be detected by the base station.

In yet another aspect of the invention, the switching unit further comprises input means for receiving a signal indicative of existence of an error in a received uplink block, and uplink error handling means, coupled to the input means for discarding a received uplink block in response to the signal indicating existence of an error therein, and for substituting therefor a substitute block including encoded speech data stored from a previously received uplink block. In this fashion, errors introduced on the PCM link during transmission of a block from the base station to the switching unit may be handled, in order to maintain the quality of speech relayed to the public telephone system by the switching unit. Detection of uplink errors may be accomplished by providing, in the base station, means for generating an error detection code from an encoded speech signal received from a mobile station, and formatting means, coupled to the generating means, for producing a formatted uplink block to be transmitted on the PCM link, the formatted uplink block having a header, the encoded speech data and/or control information, and the error detection code. Also, the switching unit includes PCM link error detecting means, coupled to the apparatus input means, for signalling existence of an error in a received uplink block in response to the received uplink block containing an error.

BRIEF DESCRIPTION OF THE DRAWINGS

The objects and advantages of the invention will be understood by reading the following detailed description in conjunction with the drawings in which.

DETAILED DESCRIPTION

Figure 2:
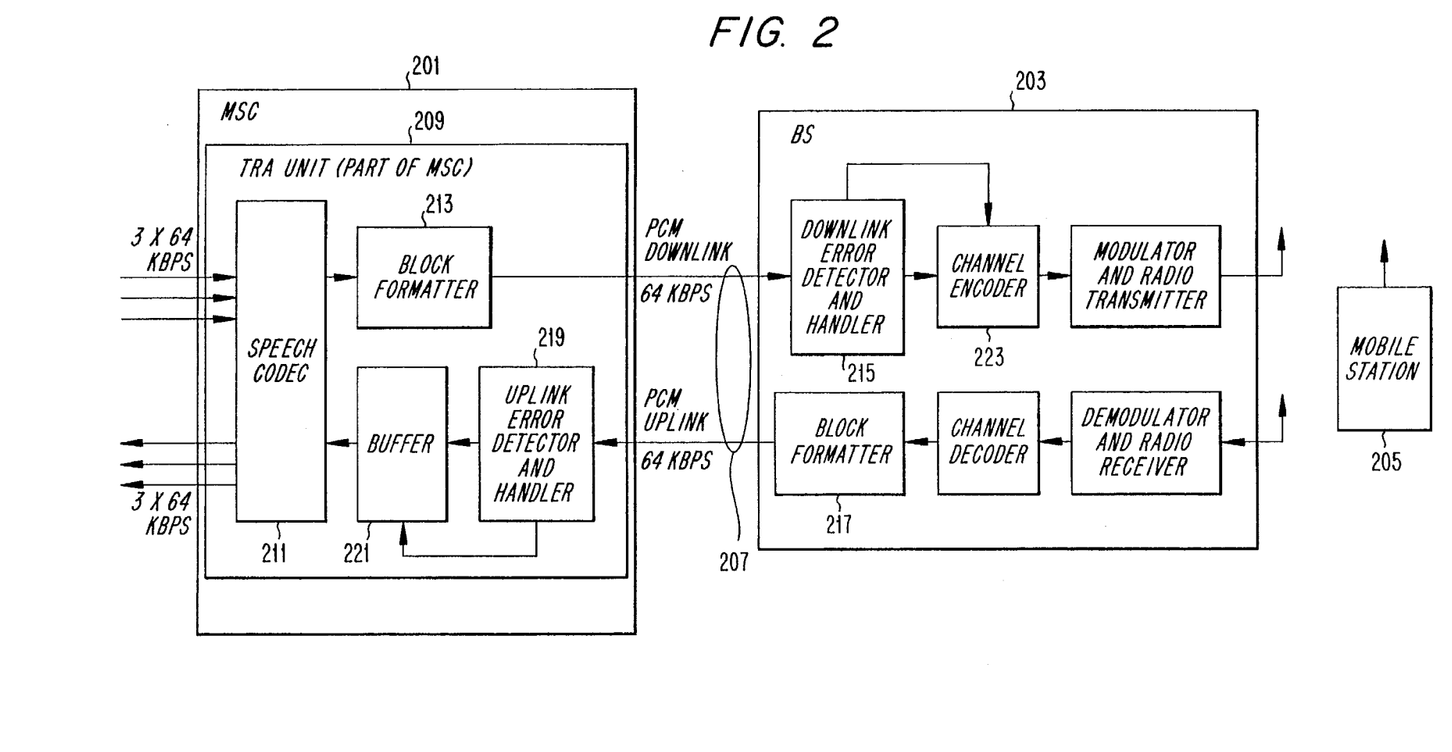
FIG. 2 is block diagram of a cellular telephone communications system in accordance with the present invention.
Figure 3:
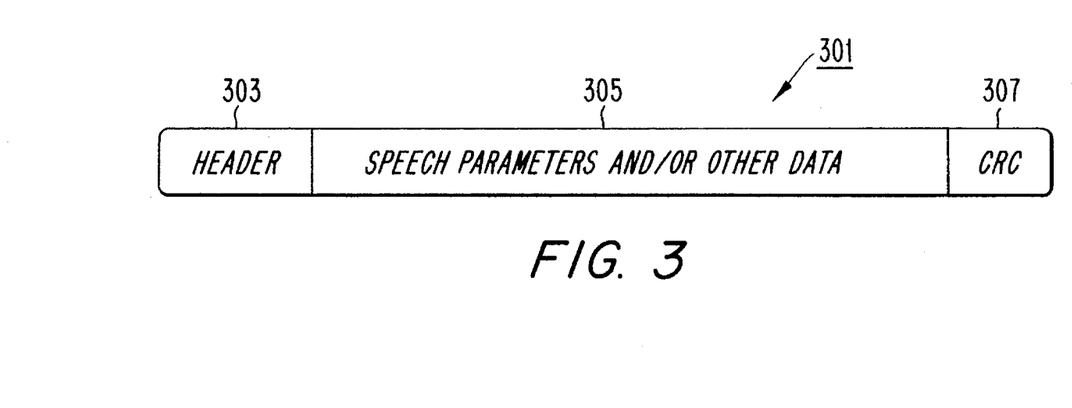
FIG. 3 is a block diagram of a block of encoded speech formatted for transmission on a PCM link, in accordance with the present invention.

A preferred embodiment of the present invention for detecting bit errors in blocks of encoded speech that are transmitted between art MSC 201 and a base station 203 by means of the PCM link 207 will now be described with reference to FIGS. 2 and 3.

Figure 4:
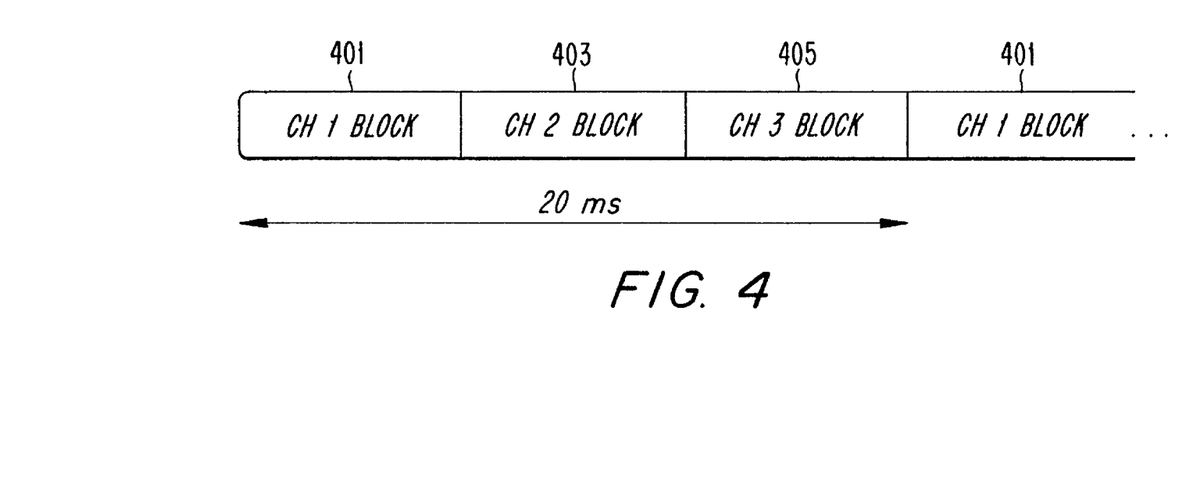
FIG. 4 is a block diagram showing time division multiplexing of blocks of encoded speech data on a PCM link.

Before being transmitted on the PCM link 207, each block of encoded speech is formatted, either by the base station block formatter 217 or the MSC block formatter 213, into block format 301. Block format 301 may be a variable size which is preferably less than or equal to 53. This upper limit makes it possible to multiplex three channels into one 64 kilobit/second (kb/sec) PCM channel, because 64kb/sec implies 160 samples per 20 msec. Consequently, each of three channels would be allocated 160/3 =53 bytes per channel. In a preferred embodiment, each PCM link 207 operates at 64 kilobits per second (kbps), and supports three speech channels in a full rate mode by transmitting time multiplexed blocks as shown in FIG. 4. Each of the time multiplexed blocks 401, 403, 405 is preferably formatted in accordance with block format 301.

The block format 301 has three positionally defined fields. The encoded speech or other data is located in the middle field 305, and for the purposes of this invention, need not be reformatted in any way during the formatting process.

At the beginning of the block format 301 is a header field 303. The header field 303 includes a synchronization sequence which identifies it as the start of a new block. The header field 303 also includes length information which specifies how many more bytes there are in the block, and receiver address fields which are used for routing the middle field 305 (containing encoded speech and/or other data) to the proper destination.

The last part of the block format 301 is an error detection code field 307. In a preferred embodiment, the error detection code is a Cyclic Redundancy Check (CRC) code. The CRC computation for the block format 301 may be performed by the MSC block formatter 213. By including an error detection code field 307 in each block, the base station downlink error detector and handler 215 can make advantageous use of well known error detection techniques to identify blocks which have had errors introduced by their transmission over the PCM link 207.

The same block format 301 may be used to detect errors introduced when the base station 203 uplinks encoded speech or other data to the MSC 201. In this case, the base station block formatter 217 formats the demodulated, channel decoded data into the block format 301 by adding the header field 303 and the error detection code field 307. After transmission via the PCM link 207, the MSC uplink error detector and handler 219 can then identify blocks which have had errors introduced during the transmission.

In another aspect of the present invention, a system and method are presented for handling the situation where errors are detected by the MSC uplink error detector and handler 219. In a preferred embodiment, the TRA 209 includes a buffer 221 interposed between the MSC uplink error detector and handler 219 and the speech codec 211. The function of the buffer 221 is to store blocks of encoded speech that are output from the MSC uplink error detector and handler 219 for decoding by the speech codec 211. In the event of an error being detected in a block received from the PCM link 207, the MSC uplink error detector and handler 219 does not output the block to the buffer 221. Instead, the MSC uplink error detector and handler 2 19 controls the buffer 221 so that the speech parameters from the previous block will again be presented to the input of the speech codec 211. Thus, the block containing errors is discarded, and replaced by the most recent block that was received without errors. This is done because the immediately preceding speech parameters are more likely to closely approximate the correct data than would the received data block which contains errors.

In a preferred embodiment of the Uplink Error Detector and Handler 219 includes a state machine having 6 states, each with a corresponding action to be performed. These states and corresponding actions are as follows:.

State 0: Entered when no error has been detected in a block received from the PCM link 107. The corresponding action is to output the received block to the buffer 221.

State 1: Entered when a first error has been detected in a block received from the PCM link 107. The corresponding action is to output the previous speech parameters, which were received when the state machine was in State 0.

State 2: Entered when a second consecutive error has been detected in a block received from the PCM link 107. The corresponding action is to output the same speech parameters that were output in State 1, that is, the speech parameters which were received when the state machine was in State 0.

State 3: Entered when a third consecutive error has been detected in a block received from the PCM link 107. The corresponding action is to output the same speech parameters that were output in State 2, except the energy parameter R0 is attenuated by 4 dB. (All of the parameters discussed here are detained by the ADC system standard: EIA/TIA INTERIM STANDARD IS-54-B, Apr. 1992, the entire contents of which are hereby incorporated by reference).

State 4: Entered when a fourth consecutive error has been detected in a block received from the PCM link 107. The corresponding action is to output the same speech parameters that were output in State 2, except the energy parameter R0 is attenuated by 8 dB.

State 5: Entered when a fifth consecutive error has been detected in a block received from the PCM link 107. The corresponding action is to output the same speech parameters that were output in State 2, except the energy parameter R0 is attenuated by 12 dB.

State 6: Entered when a sixth (or greater) consecutive error has been detected in a block received from the PCM link 107. The corresponding action is to output an energy parameter R0 set equal to zero, which will cause the speech to be completely muted.

In yet another aspect of the present invention, a system and method are presented for handling the situation where errors are detected by the base station downlink error detector and handler 215. In this case, the base station 203 must determine what data to transmit to the mobile station 205. This aspect of the invention will now be described in detail.

Communications between the base station 203 and the mobile station 205 take place on traffic channels which occur in 6.7 msec bursts. A traffic channel may be used either as a user channel (UCH) plus a slow associated control channel (SACCH), or as a fast associated control channel (FACCH) plus a SACCH. A UCH is used for coded speech information. A SACCH is a continuous channel used for signalling message exchange between the base station 203 and the mobile station 205. A fixed number of bits are allocated to the SACCH in each Time Division Multiple Access (TDMA) burst. In comparison, the FACCH is a blank-and-burst channel used for signalling message exchange between the base station 203 and the mobile station 205. Information from the control part of the base station 203 is transmitted on the FACCH, and always supersedes user information being sent on the UCH. Because it has greater bandwidth than the SACCH, the FACCH is generally used for urgent information.

Figure 5:
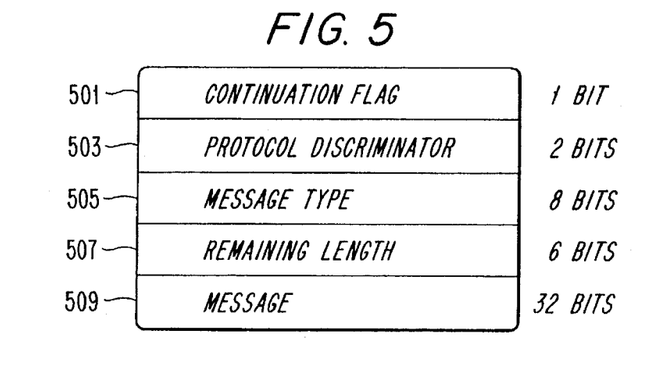
FIG. 5 is a block diagram showing the format of a control message that is sent on a fast associated control channel.

The FACCH control message has the format illustrated in FIG. 5. A one bit continuation flag 501 is followed by a two bit protocol discriminator field 503. This, in turn, is followed by an eight bit message type field 505, which is itself followed by a six bit remaining length field 507. The remaining length field 507 is followed by a thirty-two bit message field 509.

As described above, the speech codec 211 preferably converts 20 msec segments of speech into parameters having a lower bit rate than the original speech. Before transmitting these parameters to the mobile station 205, the channel encoder 223 in the base station 203 uses coding techniques specified by the ADC system standard to add error correction and detection data to the bits to be transmitted on the radio channel. For the UCH, error detection is provided by means of a CRC code (7 parity bits) applied to the 12 most perceptually significant bits of the 159 speech parameter bits. UCH error correction is provided by means of a rate ½ convolutional code applied to the 7 CRC bits and 77 of the 159 speech parameter bits. The remaining 159−77=82 bits are left uncoded. Consequently, after correction at the receiver, it is possible to detect remaining errors in 12 bits. For the FACCH, error detection is provided by means of another CRC code (16 parity bits) applied to all 49 bits of the message. Error correction is provided by means of a rate ¼ convolutional code applied to the 16 CRC bits and all 49 message bits. Consequently, after correction at the receiver, it is possible to detect remaining errors in all 49 message bits on the FACCH. Thus, FACCH bits are given a greater level of protection than the UCH bits.

The speech decoder (not shown) located in the mobile station 205 reconstructs the original speech from the received parameters. In the event that a very high bit error rate is detected in the mobile station 205, the speech quality may be maintained by repeating parameters from the previously received burst, and manipulating them in some fashion, such as with attenuation, or by adding noise. This activity by the mobile station 205 is referred to as "bad frame masking."

The mobile station 205 also performs "bad frame masking" whenever it receives control information via the FACCH. This is necessary to maintain speech quality because, as mentioned above, the control information transmitted over the FACCH supersedes the transmission of speech data.

In accordance with an embodiment of the present invention, the fact that the mobile station 205 performs "bad frame masking" is used to advantage when the base station 203 detects errors in the data block received from the PCM link 207. As mentioned above, the base station 203 must determine in this instance what to transmit to the mobile station 205. The radio channel slot format has to be maintained in order to make it possible for the receiving mobile station 205 to keep in synchronization, and to maintain the signalling channels.

According to an embodiment of the present invention, the problem is solved by transmitting a default FACCH message having no operational meaning in response to the base station 203 receiving a block containing errors. The FACCH message is sent spontaneously, without any command from the control part of the base station 203.

Figure 6:
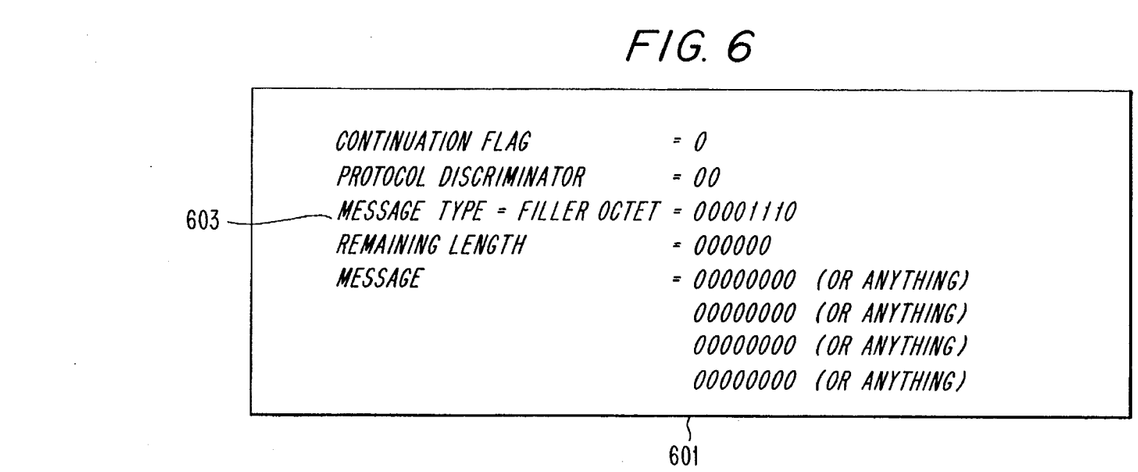
FIG. 6 is a diagram showing a default control message to be substituted for a block of encoded speech containing an error, in accordance with the present invention.

The default message should preferably be chosen in a way that does not cause the mobile station 205 to take any action or otherwise impact the radiocommunications system. In a preferred embodiment, the FACCH message is selected as shown in FIG. 6.

When the default FACCH message 601 is transmitted to the mobile station 205, the mobile station 205 recognizes the FACCH signal and responds by performing bad frame masking. The mobile station 205 also decodes the message type field 603, but does not recognize it as valid. Consequently, the message is discarded. In this fashion, speech quality at the mobile station 205 is maintained without having any additional operations performed.

In yet another embodiment of the present invention, the channel encoder 223 in the base station 203 can determine whether the control part wishes to send a "real" FACCH message at the same time that a bad block of data has been received from the PCM link 207. If so, then the real FACCH message will be sent instead of the default FACCH message 601.

By transmitting a default FACCH message as described above, a smooth solution to the problem of handling bad data from the PCM link 207 is presented, in that the mobile station's already existing mechanism for masking a bad frame is extended to cover another situation, and is thus straightforward and low cost. Also, because the radio channel often introduces bit errors, the chances of getting through with correct data is better when transmitting a FACCH message than when transmitting some other well defined data on the UCH, due to the better protection code rate on the FACCH.

In still another embodiment of the invention, well defined data that is not a FACCH message could be sent to the mobile station 205 whenever a downlink error is detected. In this embodiment, the mobile station 205 is designed to interpret this well defined data as "invalid encoded speech." However, because the UCH bits are not as well protected as a FACCH message is from errors introduced by the air interface, the use of the default FACCH message is preferable.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. In a digital cellular communication system including a switching unit coupled to a base station by means of a bidirectional pulse code modulation (PCM) link, the switching unit including a speech codes for coding downlink speech signals and decoding uplink speech signals that are respectively transmitted to and received from the base station by means of the PCM link, the PCM link conveying encoded downlink and uplink speech and control data in respective downlink and uplink blocks, the base station operating to relay an encoded downlink speech signal received from the switching unit to a mobile station by means of transmission on a radio channel and to relay to the switching unit an encoded uplink speech signal received from the mobile station by means of transmission on the PCM link, the base station further operating to send a defined control message to the mobile station by means of transmission on the radio channel when it is desired to send a command to the mobile station, said transmission of the defined control message occurring in place of the transmission to the mobile station of the encoded downlink speech signal, a system for handling errors in a transmitted block, comprising:

in the base station, input means for receiving a signal indicative of existence of an error in a received downlink block; and in the base station, downlink error handling means coupled to the input means, for discarding a received downlink block in response to the signal indicating existence of an error therein, and for substituting therefor a default control message to be relayed to the mobile station, the default control message having no meaning defined by the digital cellular communications system, whereby the mobile station, in response to receiving the default control message, performs no operation other than a bad frame masking operation.

2. The system of claim 1, wherein the default control message is a default fast access control channel (FACCH) message.

3. The system of claim 2, wherein the default FACCH message includes a message type field having a binary value '00001110'.

4. The system of claim 1, wherein the downlink error handling means substitutes for the discarded received downlink block, alternatively, the default control message or a non-default control message in response to respective non-availability or availability of the non-default control message to be transmitted.

5. The system of claim 1, further comprising:

in the switching unit, PCM link transmission means including:

means for generating an error detection code from the encoded downlink speech signal; and formatting means, coupled to the generating means, for producing a formatted downlink block to be transmitted on the PCM link, the formatted downlink block having a header, the encoded downlink speech data, and the error detection code; and in the base station, PCM link error detecting means, coupled to the input means, for signalling existence of an error in a received downlink block in response to the received downlink block containing an error.

6. The system of claim 5, wherein the error detection code is a cyclic redundancy check cede.

7. The system of claim 1, further comprising:

in the switching unit, an apparatus comprising:

input means for receiving a signal indicative of existence of an error in a received uplink block; and uplink error handling means, coupled to the input means, for discarding a received uplink block in response to the signal indicating existence of an error therein, and for substituting therefor a substitute block including encoded speech data stored from a previously received uplink block.

8. The system of claim 7, further comprising:

in the base station, PCM link transmission means including:

means for generating an error detection code from the encoded uplink speech signal; and formatting means, coupled to the generating means, for producing a formatted uplink block to be transmitted on the PCM link, the formatted uplink block having a header, the encoded uplink speech data, and the error detection code; and in the switching unit, PCM link error detecting means, coupled to the apparatus input means, for signalling existence of an error in a received uplink block in response to the received upHnk block containing an error.

9. The system of claim 8, wherein the error detection code is a cyclic redundancy check code.

10. A digital cellular communications system comprising:

a bidirectional pulse code modulation (PCM) link for conveying encoded speech and control data in a block format;

a switching unit coupled to a first end of the PCM link, the switching unit including a speech encoder for encoding speech signals;

means for generating an error detection code from the encoded speech signal; and formatting means, coupled to the generating means, for producing a formatted downlink block to be transmitted on the PCM link, the formatted downlink block having a header, the encoded speech data, and the error detection code; and a base station coupled to a second end of the PCM link, the base station including PCM link error detecting means for signalling existence of an error in a received downlink block in response to the received downlink block containing an error; and downlink error handling means, coupled to the PCM link error detecting means, for discarding a received downlink block in response to the signal indicating existence of an error therein, and for substituting therefor a default control message to be relayed to a mobile station, the default control message having no meaning defined by the digital cellular communication system, whereby the mobile station, in response to receiving the default control message, performs no operation other than a bad frame masking operation, wherein when no error is detected in the received downlink block, the base station relays to the mobile station alternatively an encoded downlink speech signal received from the switching unit or a defined control message.

11. The digital cellular communications system of claim 10, wherein the error detection code is a cyclic redundancy check code.

12. The system of claim 10, wherein the default control message is a default fast access control channel (FACCH) message.

13. The system of claim 12, wherein the default FACCH message includes a message type field having a binary value '00001110'.

14. The system of claim 10, wherein the downlink error handling means substitutes for the discarded received downlink block, alternatively, the default control message or a non-default control message in response to respective non-availability or availability of the non-default control message to be transmitted.

15. The system of claim 10, wherein the base station further comprises means for generating an error detection code from an encoded speech signal received from a mobile station; and formatting means, coupled to the generating means, for producing a formatted uplink block to be transmitted on the PCM link, the formatted uplink block having a header, the encoded speech dam, and the error detection code, and wherein the switching unit further comprises PCM link error detecting means for signalling existence of an error in a received uplink block in response to the received uplink block containing an error; and uplink error handling means, coupled to the PCM link error detecting means, for discarding a received uplink block in response, to the signal indicating existence of an error therein, and for substituting therefor a substitute block including encoded speech data stored from a previously received uplink block.

* * * * *

UNITED STATES PATENT AND TRADEMARK OFFICE
CERTIFICATE OF CORRECTION

PATENT NO. : 5,491,719
DATED : February 13, 1996
INVENTOR(S) : Patrik C. Sellin et al.

It is certified that error appears in the above-identified patent and that said Letters Patent is hereby corrected as shown below:

Column 8, claim 1,
Line 4, please change "codes" to -- codec --; and

Column 9, claim 6,
Line 2, please change "cede" to -- code --.

Signed and Sealed this

Fifth Day of March, 2002

*Attest:*

*Attesting Officer*

JAMES E. ROGAN
*Director of the United States Patent and Trademark Office*